(12) United States Patent
Allen et al.

(10) Patent No.: US 6,298,200 B1
(45) Date of Patent: Oct. 2, 2001

(54) EXPOSURE COUNT INDICATOR FOR CAMERA

(75) Inventors: Loretta E. Allen, Hilton; David C. Smart, Fairport, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/443,587

(22) Filed: Nov. 19, 1999

(51) Int. Cl.$^7$ .................................................... G03B 1/66
(52) U.S. Cl. .............................................. 396/284
(58) Field of Search ................... 396/284, 285, 396/290; 242/344, 357; 116/213

(56) References Cited

U.S. PATENT DOCUMENTS

| | | | |
|---|---|---|---|
| 2,340,624 | 2/1944 | Simmon | 396/387 |
| 4,338,015 | 7/1982 | Holmes | 396/514 |
| 4,839,678 | 6/1989 | Zawodny et al. | 396/285 |
| 6,160,963 | * 12/2000 | Kameyama et al. | 396/284 |

* cited by examiner

*Primary Examiner*—W. B. Perkey
(74) *Attorney, Agent, or Firm*—Roger A. Fields

(57) ABSTRACT

An exposure count indicator for providing a visible indication of the number of frames that remain available to be exposed or are actually exposed on a filmstrip in a camera, comprises a numerical scale of successive exposure count indicia at least divided into an initial range of indicia that are evenly spaced from one another a particular distance and a remaining range of indicia that are evenly spaced from one another a different distance less than the particular distance the exposure count indicia that are in the initial range are spaced from one another, in order that when one views the respective indicia in the remaining range after all of the indicia in the initial range have been viewed it can serve as a warning that one is coming closer to the end of the filmstrip because the indicia in the remaining range are spaced apart a lesser distance than the indicia in the initial range. Preferably, a movable indicating element is supported for movement relative to the exposure count indicia to first operate as a pointer successively at the respective indicia in the initial range and then operate as a pointer successively at the respective indicia in the remaining range.

11 Claims, 5 Drawing Sheets

EXPOSURE COUNT INDICATOR FOR CAMERA

FIELD OF THE INVENTION

The invention relates generally to the field of photography, and in particular to an exposure count indicator for a camera.

BACKGROUND OF THE INVENTION

Practically every camera that is available today includes an exposure count indicator. Typically, the exposure count indicator provides a visible indication of the number of frames that remain available to be exposed on a filmstrip in the camera, i.e. the current number of exposures that can be made on the filmstrip. Conversely, the exposure count indicator can provide a visible indication of the number of frames actually exposed on the filmstrip, i.e. the number of exposures actually made. In either case, the exposure count indicator includes a numerical scale of successive exposure count indicia that are evenly spaced from one another. The scale of indicia range from the number "1" which indicates either that only one frame remains available to be exposed on the filmstrip, or only one frame has been actually exposed, to a higher number which is the maximum number of exposures, for example "15", "24"or "40". This is shown in prior art U.S. Pat. No. 4,839,678 issued Jun. 13, 1989, and U.S. Pat. No. 2,340,624 issued Feb. 1, 1944.

PRIOR ART PROBLEM

When one views the respective indicia preparatory to exposing successive frames on a filmstrip in the camera, the only warning that there are a few frames left to be exposed is the particular indicia, e.g. "3", currently being viewed. No other warning is provided that one is coming close to the end of the filmstrip.

SUMMARY OF THE INVENTION

Generally, an exposure count indicator for providing a visible indication of the number of frames that remain available to be exposed or are actually exposed on a filmstrip in a camera, the exposure, count indicator comprising:

a numerical scale of successive exposure count indicia which follow immediately one after the other in sequence, at least some of which that follow immediately one after the other in sequence are spaced differently than others that follow immediately one after the other in sequence.

More specifically, an exposure count indicator for providing a visible indication of the number of frames that remain available to be exposed or are actually exposed on a filmstrip in a camera, comprises:

a numerical scale of successive exposure count indicia at least divided into an initial range of indicia that are evenly spaced from one another a particular distance and a remaining range of indicia that are evenly spaced from one another a different distance less than the particular distance the exposure count indicia that are in the initial range are spaced from one another, in order that when one views the respective indicia in the remaining range after all of the indicia in the initial range have been viewed it can serve as a warning that one is coming closer to the end of the filmstrip because the indicia in the remaining range are spaced apart a lesser distance than the indicia in the initial range.

Preferably, a movable indicating element is supported for movement relative to the exposure count indicia to first operate as a pointer successively at the respective indicia in the initial range and then operate as a pointer successively at the respective indicia in the remaining range.

DETAILED DESCRIPTION OF THE INVENTION

The invention is disclosed as being embodied preferably in a so-called one-time-use or single-use disposable camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
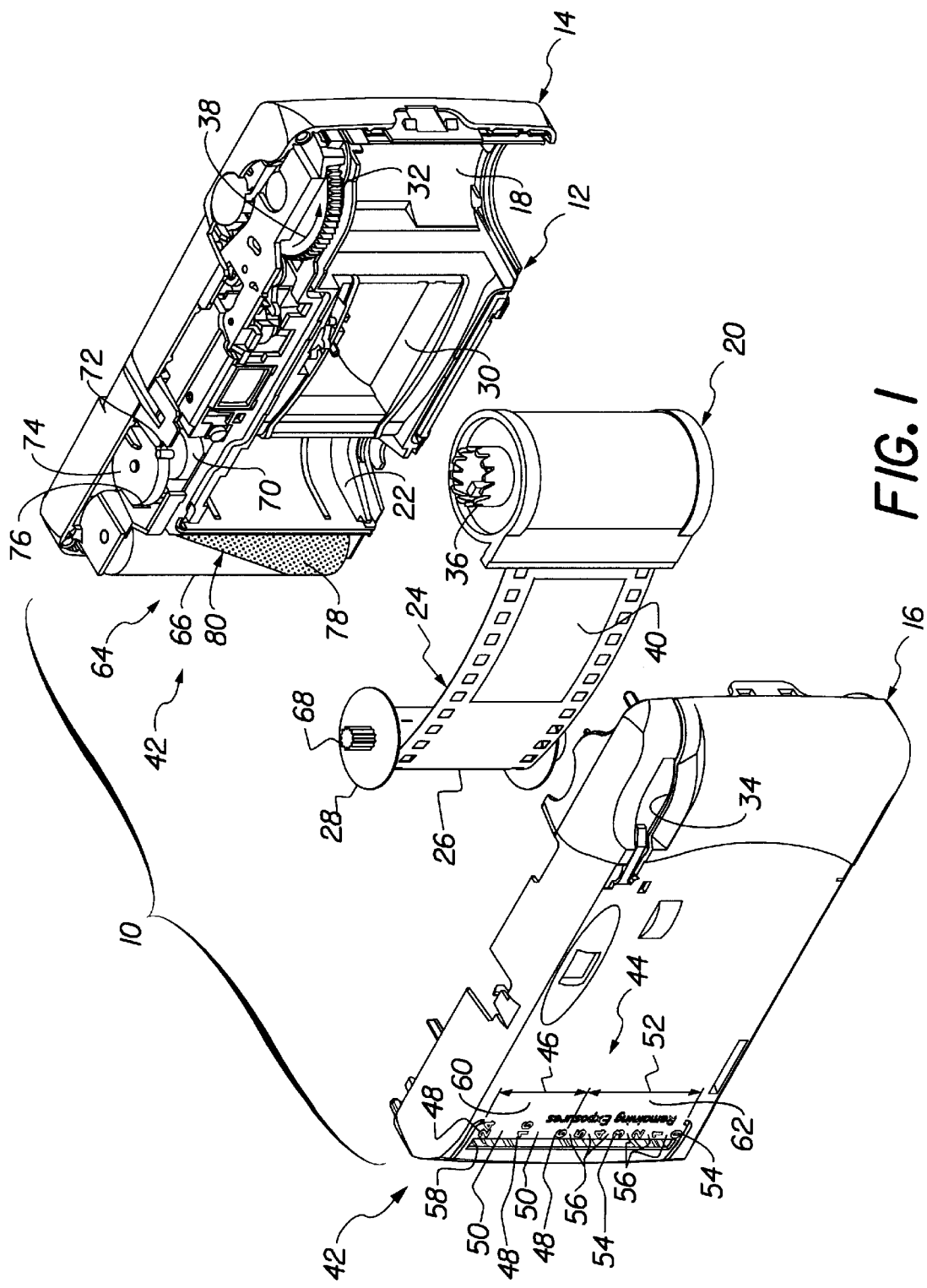
FIG. 1 is an exploded rear perspective view of a camera including an exposure count indicator according to a preferred embodiment of the invention.
Figure 2:
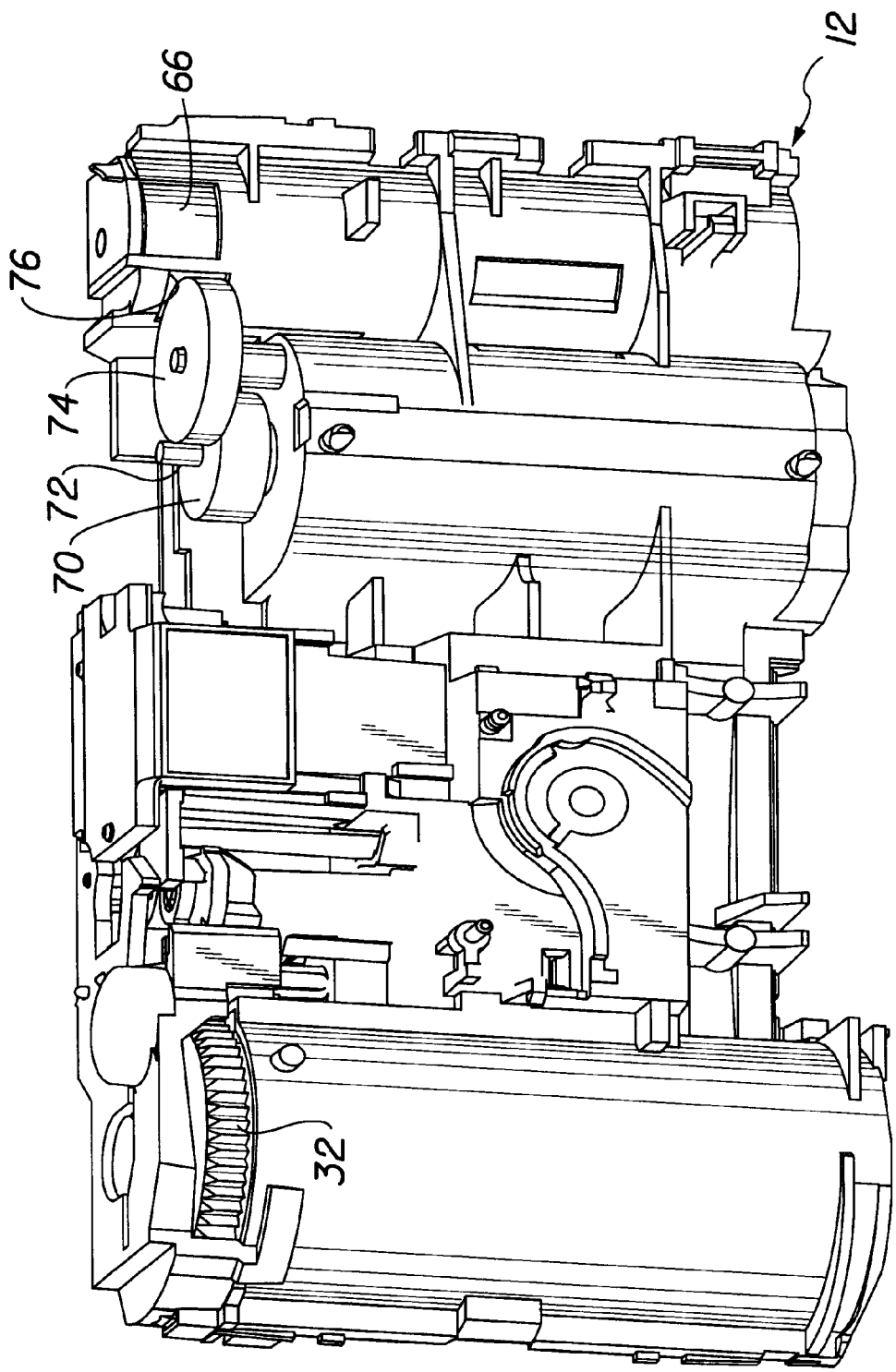
FIG. 2 is a front perspective view of the camera shown with a front cover part removed.

Referring now to the drawings, FIG. 1 shows a one-time-use camera 10. The one-time-use camera 10 includes a plastic opaque main body part 12, a plastic opaque front cover part 14, and a plastic opaque rear cover part 16. The front cover part 14 and the rear cover part 16 house the main body part 12 between them and are connected releasable to one another and to the main body part 12 via known flexible hook-in-hole connections.

As is typical, the main body part 12 has a rearwardly open cartridge receiving chamber 18 for a conventional film cartridge 20 and a rearwardly open film supply chamber 22 for an unexposed filmstrip 24. See FIG. 1. The unexposed filmstrip 24, except for a trailing end portion (not shown) in the film cartridge, is wound into an unexposed film roll 26 on a rotatable film spool 28 in the film supply chamber. A rearwardly open, rectangular-shaped backframe (exposure) opening 30 is located intermediate the cartridge receiving chamber 18 and the film supply chamber 22 for exposing successive frames (imaging areas) 40 of the filmstrip 24 when ambient light is received through a front taking lens, not shown, on the main body part 12.

A manual film winder or film winding thumbwheel 32, rotatably supported on the main body part 12, above the cartridge receiving chamber 18, radially protrudes partially from an elongate narrow opening 34 in the rear cover part 16 and has a depending coaxial stem, not shown, in, coaxial engagement with an exposed top end 36 of a film take-up spool inside the film cartridge 20. The film winding thumbwheel 32 is manually grasped or fingered to rotate the thumbwheel in a film winding direction 38, i.e. counterclockwise in FIG. 1, to similarly rotate the film take-up spool inside the film cartridge 20. This is done in order to wind an exposed frame (imaging area) 40 of the filmstrip 24 from the backframe opening 30 into the film cartridge 20 and to move a fresh unexposed frame (imaging area) 40 of the filmstrip from the unexposed film roll 26 on the film spool 28 to the backframe opening. Each time a fresh unexposed frame 40 is drawn off the film spool 28, the film spool is rotated incrementally in a film unwinding direction, i.e. counter-clockwise in FIG. 1, which is the same direction as the film winding direction 28 of the thumbwheel 32.

An exposure count indicator 42 for providing a visible indication of the number of frames 40 that remain to be exposed on the filmstrip 24 is shown in FIGS. 1–10.

The exposure count indicator 42 includes a numerical scale 44 of successive exposure count indicia divided into an initial range 46 of indicia 48 that are evenly spaced from one another a particular distance 50 to follow immediately one after the other in sequence and a remaining range 52 of indicia 54 that are evenly spaced from one another a different distance 56 to follow immediately one after the other in sequence. The different distance 56 the remaining range 52 of indicia 54 are evenly spaced from one another is substantially less than the particular distance 50 the initial range 46 of indicia 48 are evenly spaced from one another. FIG. 1 shows the indicia 48 in the initial range 46 as the numbers "24", "16"and "6", and the indicia 54 in the remaining range 52 as the numbers "5", "4", "3", "2", "1" and "0". Thus, the total number (3) of the indicia 48 that are visible in the initial range 46 is less than the total number (6) of the indicia 54 that are visible in the remaining range 52. However, the indicia 48 in the initial range 46 cover a greater extent (or span of numbers), i.e. from "24"to "6", than is covered by the indicia 54 in the remaining range 52, i.e. from "5" to "0". The number "24" represents the maximum number of frames 40 originally available to be exposed on the filmstrip 24, and the number "1" represents the last frame remaining to be exposed on the filmstrip.

As shown in FIG. 1, the indicia 48 in the initial range 46 and the indicia 54 in the remaining range 52 are arranged to extend in a in a single straight line on the rear cover part 16 to all be co-planar, i.e., in the same plane, and alongside a window 58 in the rear cover part. All of the indicia 48 are the same size, and do not deviate from the single straight line as would a curve. The indicia 48 in the initial range 46 occupy a first longitudinal area 60 on the rear cover part 16 and the indicia 54 in the remaining range 52 occupy a second longitudinal area 62 greater (longer) than the first longitudinal area.

A movable indicating element 64 includes a rotatable cylinder 66. The cylinder 66 is rotated as follows. The film spool 28 in the film supply chamber 22 has a top pinion 68 that coaxially engages a first rotatable disk 70 on the main body part 12 which, in turn, has a top projection 72 that peripherally engages a second rotatable disk 74 on the main body part. The second disk 74 partially extends through a hole 76 in the main body part 12 to peripherally engage the cylinder 66. Thus, each time the film spool 28 is rotated counter-clockwise in FIG. 1 because a fresh unexposed frame 40 is drawn off the film spool, the cylinder 66 is rotated incrementally in the same direction, but to a much less extent than the film spool.

Figure 4:
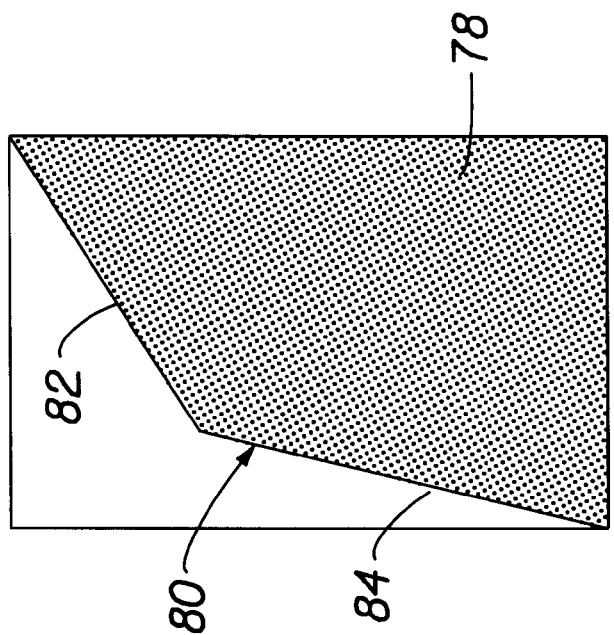
FIG. 4 is an elevation view of the indicating element shown flat for clarity.
Figure 3:
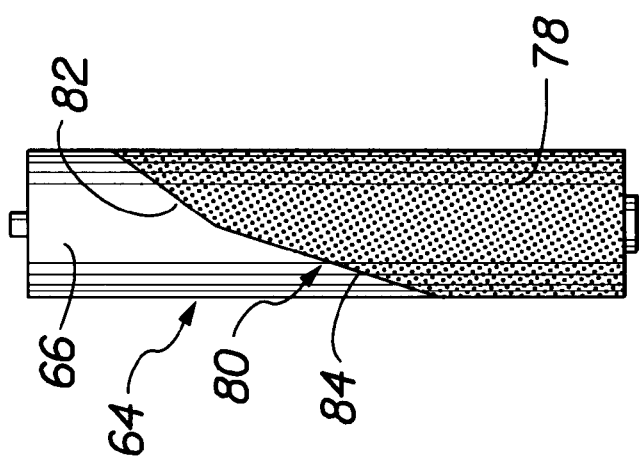
FIG. 3 is an elevation view of a cylindrical-shaped rotatable indicating element of the exposure count indicator.
Figure 5:
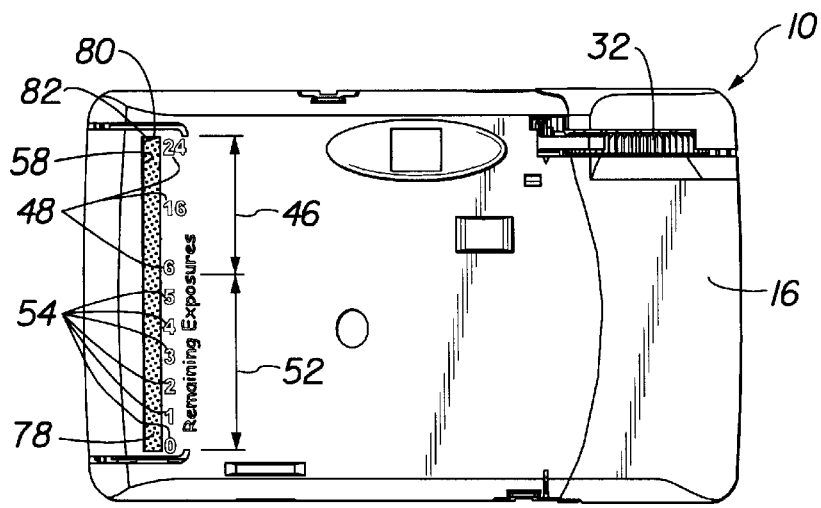
FIGS. 5–10 are rear elevation views of the camera showing operation of the exposure count indicator to provide different exposure count indications.
Figure 6:
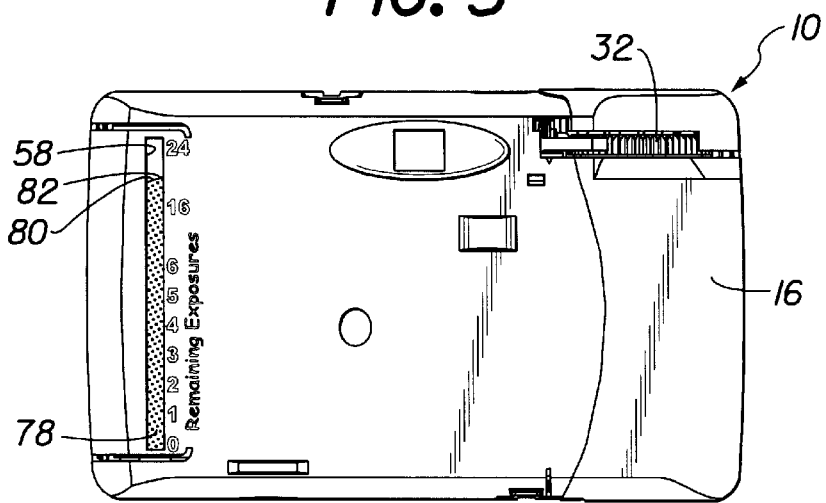
Figure 7:
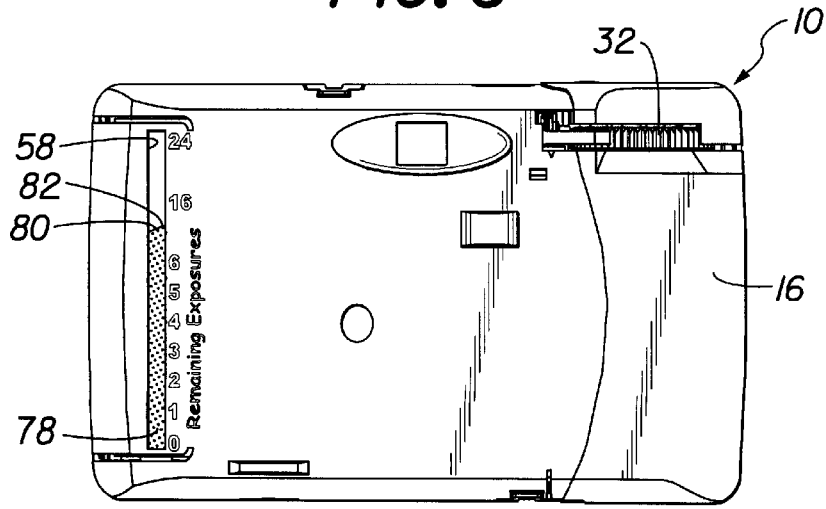
Figure 8:
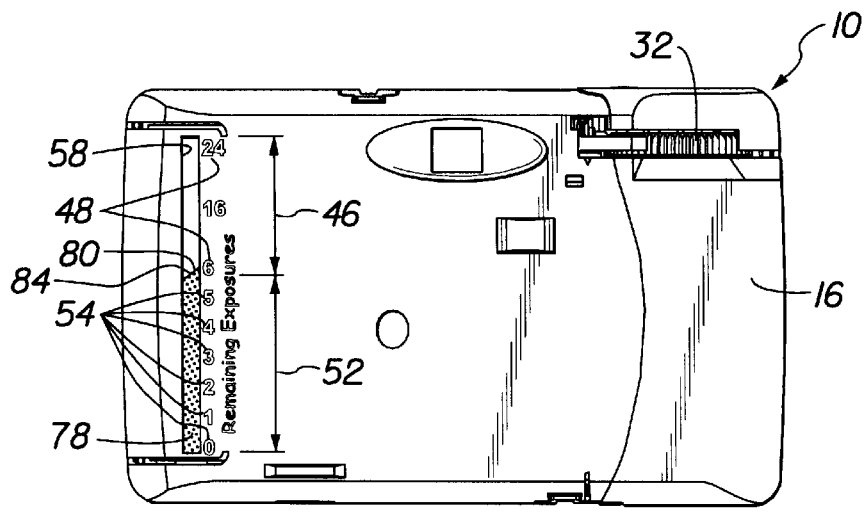
Figure 9:
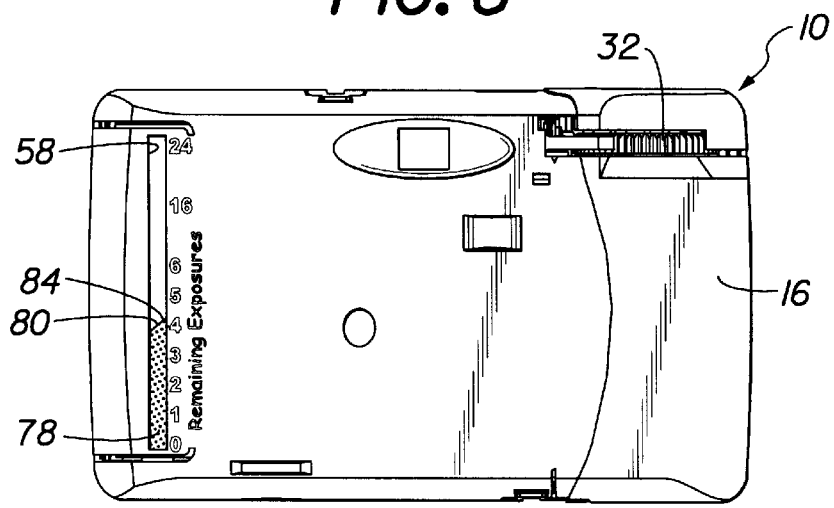
Figure 10:
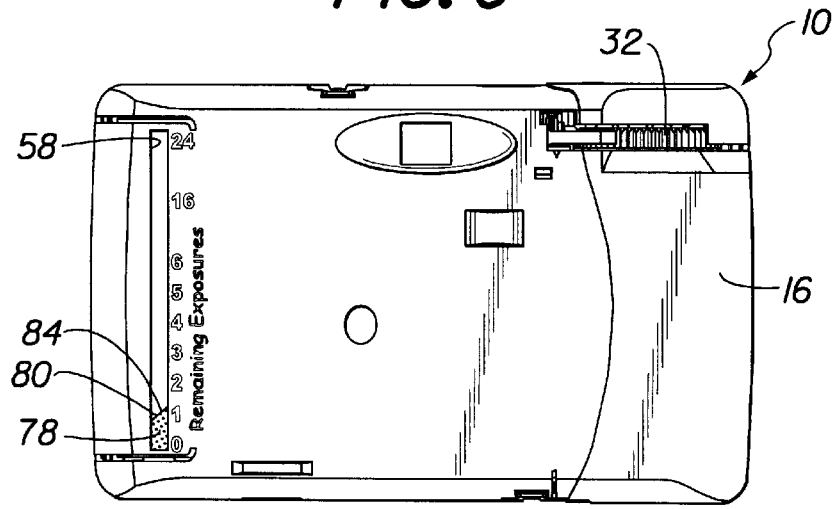

An opaque layer 78 on the cylinder 66 includes an angled edge that defines an indicating line 80. As can be seen in FIGS. 3 and 4, the indicating line 80 has an initial section 82 that longitudinally extends at one angle to operate as a pointer successively at the respective indicia 48 in the initial range 46, when the cylinder is rotated counter-clockwise in FIG. 1, and has, a remaining section 84 that longitudinally extends at another angle to operate as a pointer successively at the respective indicia 54 in the remaining range 52, when the cylinder is further rotated in the same direction. This is shown FIGS. 5–10. The opaque layer 78 is located behind the window 58 to progressively block less of the window beginning successively at the respective indicia 48 in the initial range 46 and then continuing successively at the respective indicia 54 in the remaining range 52. This is often referred to as a "gas-gauge" type indicator, Since the indicia 54 in the remaining range 52 are evenly spaced apart a distance 56 that is less than the distance the indicia 48 in the initial range 46 of indicia 48 are evenly spaced apart, when the opaque layer 78 is positioned behind the window 58 as shown in FIG. 8–10, it serves as a visible warning that one is coming close to the end of the filmstrip 24, i.e. there are only a few frames 40 on the filmstrip that remain available to be exposed.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. rear cover part
18. cartridge receiving chamber
20. film cartridge
22. film supply chamber
24. filmstrip
26. unexposed film roll
28. film spool
30. backframe opening
32. film winding thumbwheel
34. opening
36. spoolend
38. film winding direction
40. film frame
42. exposure count indicator
44. numerical scale
46. initial range
48. exposure count indicia
50. even distance
52. remaining range
54. exposure count indicia
56. even distance
58. window
60. first longitudinal area
62. second longitudinal area
64. indicating element
66. cylinder
68. pinion
70. first disk
72. projection
74. second disk
76. hole
78. opaque layer
80. indicating line
82. initial section
84. remaining section

What is claimed is:

1. An exposure count indicator for providing a visible indication of the number of frames that remain available to be exposed or are actually exposed on a filmstrip in a camera, said exposure count indicator comprising:

a numerical scale of successive co-planar exposure count indicia which all have the same size, follow immediately one after the other in sequence, at least some of which that follow immediately one after the other in sequence are spaced differently than others that follow immediately one after the other in sequence.

2. An exposure count indicator for providing a visible indication of the number of frames that remain available to be exposed or are actually exposed on a filmstrip in a camera, said exposure count indicator comprising:

a numerical scale of successive co-planar exposure count indicia at least divided into an initial range of more than one indicia that are evenly spaced from one another a particular distance and a remaining range of more than one indicia that are evenly spaced from one another a different distance less than the particular distance said exposure count indicia that are in the initial range are spaced from one another, in order that when one views the respective indicia in said remaining range after all of the indicia in said initial range have been viewed it can serve as a warning that one is coming closer to the end of the filmstrip because the indicia in the remaining range are spaced apart a lesser distance than the indicia in the initial range.

3. An exposure count indicator as recited in claim 2, wherein a movable indicating element is supported for movement relative to said exposure count indicia to first operate as a pointer successively at the respective indicia in the initial range and then operate as a pointer successively at the respective indicia in the remaining range.

4. An exposure count indicator as recited in claim 3, wherein said movable indicating element includes an indicating line which has an initial section that longitudinally extends at one angle to operate as a pointer successively at the respective indicia in the initial range, when the element is moved, and has a remaining section that longitudinally extends at another angle to operate as a pointer successively at the respective indicia in the remaining range, when the element is moved.

5. An exposure count indicator as recited in claim 2, wherein the total number of said exposure count indicia that are in the initial range is less than the total number of said exposure count indicia than are in the remaining range.

6. An exposure count indicator as recited in claim 5, wherein the number of said exposure count indicia that are in the initial range occupy a first longitudinal area and said exposure count indicia that are in the remaining range occupy a second longitudinal area greater than the first longitudinal area.

7. An exposure count indicator as recited in claim 2, wherein said exposure count indicia that are in the initial range include one indicia which represents the maximum number of frames originally available to be exposed on the filmstrip and said exposure count indicia that are in the remaining range include one indicia that represents the last frame remaining to be exposed on the filmstrip.

8. An exposure count indicator as recited in claim 2, wherein said initial range covers a greater extent of said exposure count indicia than does said remaining range.

9. An exposure count indicator as recited in claim 2, wherein said initial range and said remaining range extend in a single straight non-curved, line.

10. An exposure count indicator as recited in claim 9, wherein said exposure count indicia are located alongside a window, and a movable indicating element is supported for movement behind said window to progressively block less of the window beginning successively at the respective indicia in the initial range and then continuing successively at the respective indicia in the remaining range.

11. An exposure count indicator for providing a visible indication of the number of frames that remain available to be exposed or are actually exposed on a filmstrip in a camera, said exposure count indicator comprising:

a numerical scale of co-planar successive co-planar exposure count indicia all of which do not deviate from a single straight line as would a curve and follow immediately one after the other in sequence, and several of which are spaced differently than others.

* * * * *